US007722722B2

(12) United States Patent
English et al.

(10) Patent No.: US 7,722,722 B2
(45) Date of Patent: May 25, 2010

(54) CONTINUOUS FLUID BED REACTOR

(75) Inventors: Thomas Joseph English, Parkesburg, PA (US); Athanassios Souvaliotis, Vienna, VA (US); Manish B. Shah, Somerset, NJ (US)

(73) Assignee: Brunob II B.V., Arnhem (NL)

( * ) Notice: Subject to any disclaimer, the term of this patent is extended or adjusted under 35 U.S.C. 154(b) by 272 days.

(21) Appl. No.: 11/941,288

(22) Filed: Nov. 16, 2007

(65) Prior Publication Data
US 2009/0126721 A1 May 21, 2009

(51) Int. Cl.
C08B 30/00 (2006.01)
C08B 30/20 (2006.01)
F27B 15/08 (2006.01)
B01J 3/00 (2006.01)
B01D 33/00 (2006.01)

(52) U.S. Cl. .................. 127/71; 127/1; 127/23; 127/28; 127/34; 127/65; 422/139; 422/147; 210/323.1; 210/348; 210/472

(58) Field of Classification Search ................. 422/147, 422/139; 423/350; 127/1, 23, 28, 34, 65, 127/71; 210/348, 323.1, 472
See application file for complete search history.

(56) References Cited

U.S. PATENT DOCUMENTS

| | | | | |
|---|---|---|---|---|
| 2,419,245 A * | 4/1947 | Arveson | ...... | 502/43 |
| 3,615,256 A * | 10/1971 | Miller et al. | ...... | 422/146 |
| 5,169,913 A | 12/1992 | Staffin et al. | | |
| 5,198,029 A * | 3/1993 | Dutta et al. | ...... | 118/303 |
| 5,245,093 A * | 9/1993 | Ember | ...... | 585/266 |
| 5,335,609 A * | 8/1994 | Nelson et al. | ...... | 110/346 |
| 5,378,434 A | 1/1995 | Staffin et al. | | |
| 6,191,116 B1 * | 2/2001 | Kasica et al. | ...... | 514/23 |
| 2006/0249023 A1* | 11/2006 | Pranda et al. | ...... | 95/273 |
| 2009/0130004 A1* | 5/2009 | Archibald et al. | ...... | 422/286 |

OTHER PUBLICATIONS

Frederick K. Mallon, W. Harmon Ray; Modeling of Solid-State Polycondensation. II. Reactor Design Issues; Journal of Applied Polymer Science, vol. 69, pp. 1775-1778, 1997.
Ivano Miracca, Guido Capone; The Staging in Fluidised Bed Reactors: From CSTR to Plug-Flow; Chemical Engineering Journal 82 (2001), pp. 259-266.
O. Rubio, J. Herguido, M. Menendez, G. Grasa and J.C. Abanades; Oxidative Dehydrogenation of Butane in an Interconnected Fluidized-Bed Reactor, American Institute of Chemical Engineers AIChE J, (2004), pp. 2520-1522.
Rashmi M. Contractor; Dupont's CFB Technology for Maleic Anhydride; Chemical Engineering Science 54 (1999), pp. 5627-5632.

* cited by examiner

*Primary Examiner*—Walter D Griffin
*Assistant Examiner*—Huy-Tram Nguyen
(74) *Attorney, Agent, or Firm*—Karen G. Kaiser

(57) ABSTRACT

The present invention is concerned with an apparatus and method for continuous fluidization which comprises at least two cells connected by an aperture permitting the solid material to be introduced into the next downstream cell by fluidized horizontal flow, an isolated freeboard within each cell, at least two filter sticks contained within the isolated freeboard of each cell, and at least one blow back valve contained within each filter stick. The apparatus allows processing of materials that are typically difficult to fluidize by maintaining a substantially constant pressure difference between each isolated freeboard.

18 Claims, 3 Drawing Sheets

Figure 1 - Prior Art

CONTINUOUS FLUID BED REACTOR

FIELD OF THE INVENTION

The present invention is concerned with an apparatus and method for continuous fluidization, and, in one embodiment, with the continuous fluidization of materials that are difficult to process.

BACKGROUND OF THE INVENTION

Various types of fluidization processes have been used for many years for a number of different operations and/or processes. In general, in fluidized systems a solid phase is suspended in an upwardly moving gas stream.

High turbulence existing in a fluidized bed provides high heat transfer characteristics, and can cause almost complete mixing of the solids with the fluidizing gas to form a relatively homogeneous gas-solid system.

The occurrence of channeling, caused by the formation of pockets in the solid phase, can result in the passage of gas through the solids without there being intimate contact with the solid phase.

Channeling is partially minimized by the use of a plurality of tubular zones through which the fluidizing gas is passed in contact with the solid phase. Each tube operates as an individual fluidized bed having a much smaller cross sectional area, and, overall, such tubular bed systems have greater heat transfer characteristics because of increased surface area availability.

Materials having cohesive characteristics have a tendency to form aggregates during fluidization in tubular zones and may therefore be difficult to fluidize. Starch is an example of such a cohesive material, and it tends to form lumps or agglomerates within fluidized bed reactors resulting in severe channeling and incomplete conversion of the starch.

SUMMARY OF THE INVENTION

The present invention is concerned with continuous fluidized bed apparatus for use in the fluidization of solid materials, including materials that are difficult to fluidize, particularly solid particulate materials that have a tendency to adhere or agglomerate to form cohesive masses, wherein said apparatus comprises: (a) two or more cells wherein each cell has its own isolated freeboard; and (b) two or more filter sticks contained within the freeboard of each cell; and wherein a constant pressure difference is maintained between each isolated freeboard.

In one embodiment, the continuous fluidized bed apparatus of this invention comprises about 10 or more cells.

The constant pressure difference between each isolated freeboard establishes a constant height of fluidized particles within each cell.

DETAILED DESCRIPTION OF THE INVENTION

A typical fluidized bed system, used in use in the industry to process particles, is described in U.S. Pat. No. 5,378,434 (Procedyne) incorporated herein by reference, and illustrated in FIG. 1 by a single shell reactor. This reactor has three full compartment separations, 31A, 31B, 31C to provide for three independent gas recirculation systems 44A, 44B, 44C, with each compartment or zone separation containing three stage baffles to form four stages per zone, 60A, 60B, 60C, and 60D in zone 31A; 60E, 60F, 60G and 60H in zone 31B; and 60I, 60J, 60K and 60L in zone 31C.

Particles are continuously fed through feed port 58, at the feed zone 59, which feeds into first stage 60A of the first zone 31A, and then on to successive stages.

The passage of fluidized particles from stage to stage within a given zone is accomplished by providing alternating slots in the zone separation partitions 61A, 62A, 63A, 64A; 61B, 62B, 63B, 64B; 61C, 62C, 63C, 64C, to accomplish the continuous flow. This creates a serpentine course for the fluidized particles to flow. These slots appear at opposite ends of the zone separation partitions adjacent opposite side walls of the reactor vessel, and provide a means for the serpentine course of flow.

Since there is a continuous feed at the feed end of the unit, the growing weight, and the bed levels in the zones, provides the driving force to keep the fluidized bed of solids moving toward and then through the discharge zone of the unit, 56, and then out through the discharge port of the vessel 57.

Figure 1:
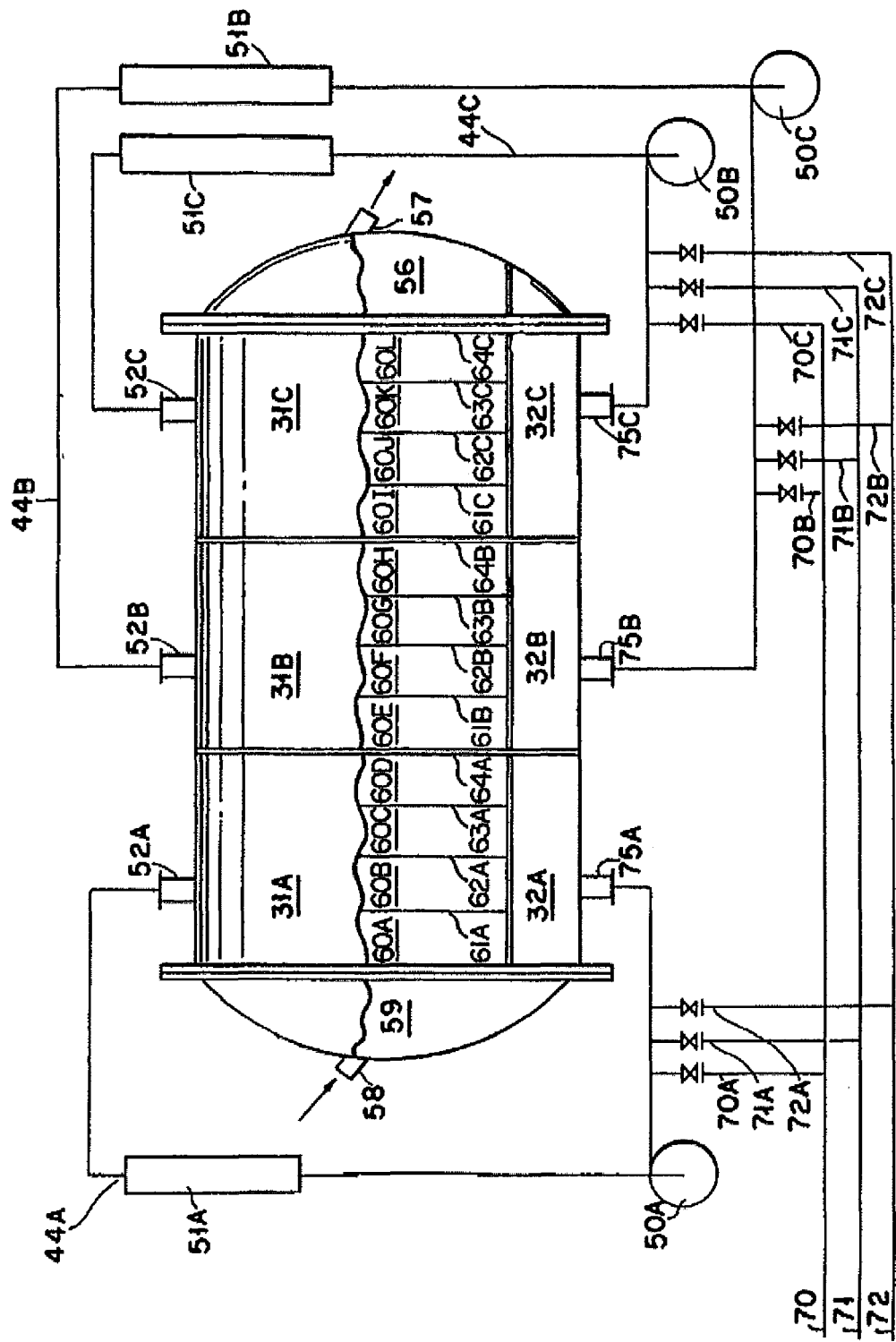
FIG. 1 presents a schematic representation of a typical continuous fluidized bed reactor.

In the illustrated example of FIG. 1 with three zone subdivisions, each containing four stages, the zone subdividing walls 64A, 64B, and 64C, are sealed to the shell wall in the plenum volumes 32A, 32B and 32C, in the fluid bed; and in the freeboard volumes above, the fluid bed 31A, 31B and 31C, and thereby keeping the fluidizing gases and gases to be recycled separate from the respective gases of each adjacent zone.

Fluidizing gas enters each zone, respectively at 75A, 75B and 75C. The fluidizing gas streams consist of the recycle gas from recycle systems 44A, 44B and 44C, and the make-up gases from 70, 71 and 72. Make up gas lines 70, 71 and 72, join the recycle system 44A, 44B and 44C through supply lines 70A, 70B, 70C, 71A, 71B, 71C, 72A, 72B and 72C. The plurality of supply lines permits the process operator to select the composition of the gas separately and independently for each zone. A fluidized bed is maintained by controlling the circulating gas rate to maintain a suitable fluidization velocity dependent on the size and density of the particles in given reaction zone.

Each recycle gas stream after leaving the reactor through exit ports 52A, 52B, 52C is cooled in heat exchangers 51A, 51B and 51C, then it is pumped with compressors 50A, 50B and 50C, and mixed with the make-up gases to adjust composition, and returned to the reactor. The temperatures of the fluidizing gas entering feed ports 75A, 75B, and 75C are kept sufficiently below the fluid bed temperature in the respective stages to accomplish the required energy balance of the zone.

The present invention is directed to continuous fluidized bed apparatus for the fluidization of solid materials, particularly solid particulate materials that are difficult to fluidize, such as materials that have a tendency to adhere or agglomerate. The apparatus of the present invention may be useful, for example, in chemical and/or physical processes (such as, without limitation, polymerization reactions, coal gasification systems and soil remediation) in which particulate materials are fluidized and subjected to heat transfer during fluidization, usually to supply heat to the particulate material.

In another embodiment, this invention provides a process for the fluidization of solids that are difficult to fluidize. In yet another embodiment, such process is characterized by the absence of channeling.

In yet another embodiment, this invention provides apparatus and a process for the fluidization of solids where such apparatus and process provide improved homogeneity and improved heat transfer characteristics and where solids are efficiently converted within uniform residence times.

In a non-limiting aspect, where the continuous fluidized bed apparatus of this invention comprises more than one cell, the pressure within the freeboard of each cell need not be equivalent to the pressure in adjoining cells. In one aspect of the invention, the apparatus has at least 10 cells, in another at least 25 cells, and in a third at least 50 cells.

If pressure varies within a freeboard cell, then the freeboard pressure within every cell varies by substantially the same amount at substantially the same time; this balances pressures within the reactor and prevents back flow from occurring and maintains constant bed height within each individual cell, although bed height of all the cells need not be the same. The constant bed height leads to substantially consistent feed and discharge rates, fast response and rise to steady state, and a tight residence time distribution. Substantially the same pressure means no more than a difference of 1000 Pa, in another embodiment no more than 500 Pa and in a third embodiment no more than 250 Pa. Substantially the same time means no more than a difference of 0.25 seconds, in another embodiment no more than 0.5 seconds and in a third embodiment no more than 0.01 seconds. One skilled in the art would appreciate that changes in the fluidized density will change the flow sensitivity to pressure changes.

Whenever blow back occurs, it occurs simultaneously in the same number of filter stick blow back valves in every cell—this reduces freeboard pressure variation. Simultaneously means within 0.25 seconds, in another embodiment within 0.5 seconds and in a third embodiment within 0.01 seconds.

Blow back valves switch filter operation between blow back and the venting of fluidizing gas. A gap in the ceiling of the unit allows gas to flow between cells to maintain the pressure difference between them.

To minimize freeboard pressure variation in the reactor, blow back of the filter sticks is simultaneous and involves the same number of filter sticks per cell in every cell.

Simultaneous blow back involves precise control of the timing of filter stick blow back valves. These valves switch filter operation between blow back and the venting of fluidizing gas.

Filter take away/blow back lines connecting filter sticks allow gas to flow between cells to maintain a pressure difference between them.

Figure 2:
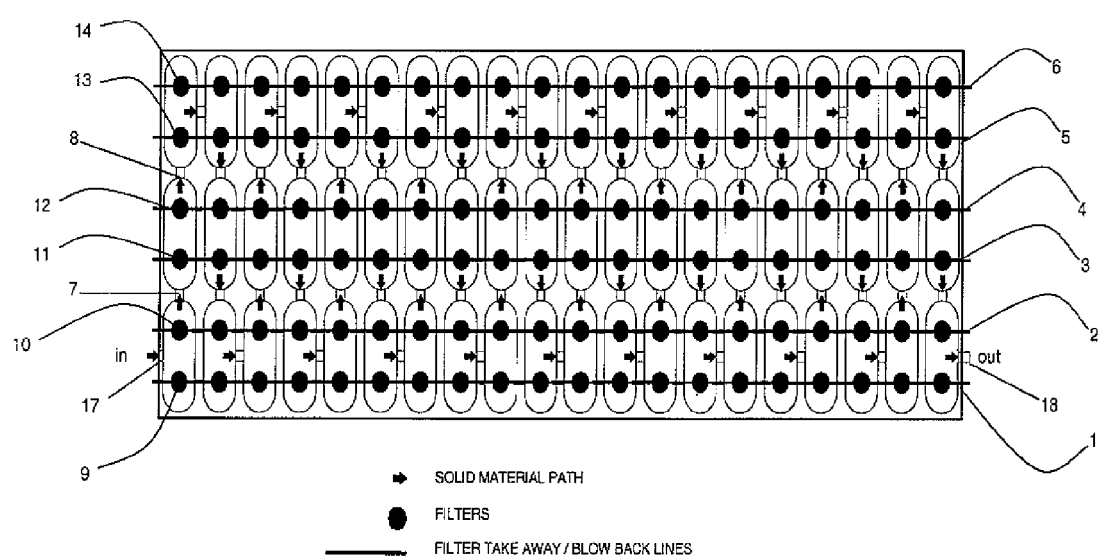
FIG. 2 presents a continuous fluid bed reactor overhead schematic of an embodiment of the present invention, wherein 60 cells are represented with each individual cell acting as a fluidized bed. Each cell has two filters. The filters are connected as indicated by blow back lines to provide six columns of interconnected filters. The cells are arranged in 20 rows. There are 3 cells per row. The material passes through the reactor in a serpentine path.

One embodiment of the invention is shown in the overhead schematic continuous fluidized bed reactor illustrated in FIG. 2.

With reference to FIG. 2, in the continuous fluidized bed reactor of this invention, the pressure drop driving force from cell to cell which maintains flow of particles is accomplished by the fluid bed level at the feed end 17 of the reactor being slightly higher in level than at the overflow port 18. This is analogous to hydrostatic head which maintains the flow of a liquid in a long channel. Typical level increases are of the order of one to four inches of water column per twenty feet of reactor length. In the same way, when the fluidized particles pass through the slots in the zone separation partitions 7 and 8, the pressure drop is of the order of 0.01 to 0.07 inches of water column for a starch powder with roughly a 350 kg/m$^3$ fluidized density, which is reflection in an equivalent drop in fluid bed level between successive zones. Filter take away/blow back lines 1, 2, 3, 4, 5, 6 serve as an exhaust for fluidization gas, as a supply for blow back gas, and to allow gas to flow between cells to maintain a pressure difference between them.

Figure 3:
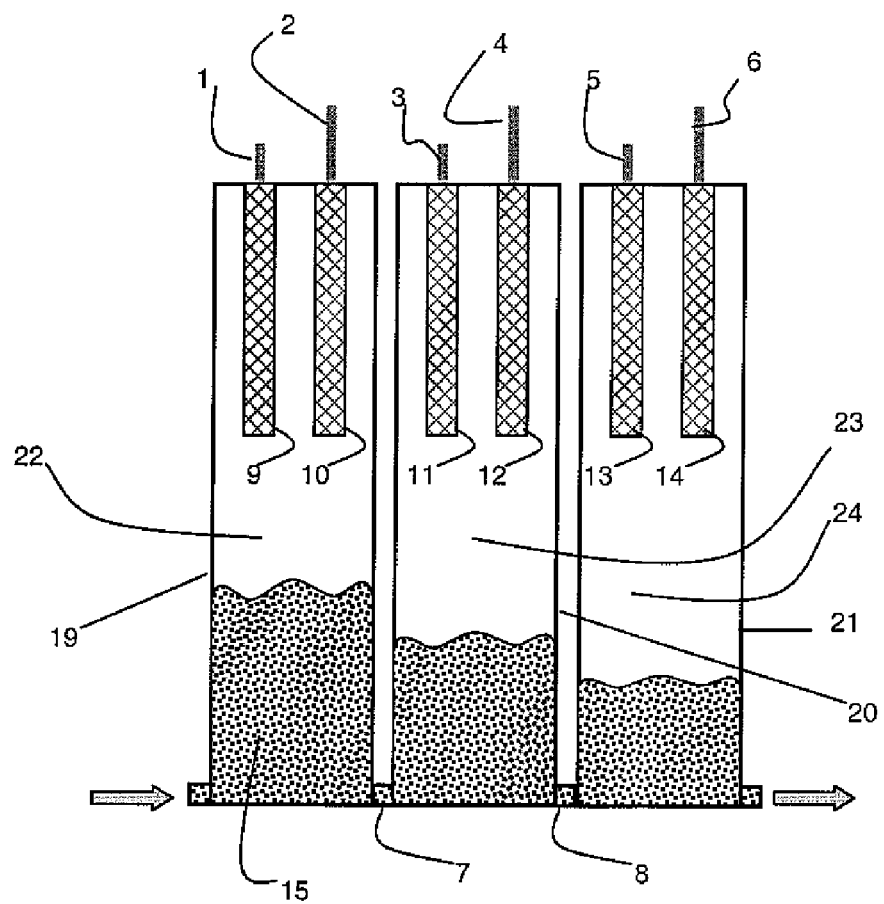
FIG. 3 presents a side schematic representation of a continuous fluidized bed reactor according to one embodiment of this invention.

As illustrated in FIG. 3, one embodiment of this invention resides in each cell 19, 20, 21 having its own isolated freeboard 22, 23, 24 and there being included at least two filter sticks 9, 10, 11, 12, 13, 14 within each freeboard whereby a constant pressure difference is maintained between each isolated freeboard. This allows the fluidization of solid materials 15, particularly solid particulate materials that have a tendency to adhere or agglomerate to form cohesive masses.

A non-limiting aspect of the continuous fluidized bed reactor of this invention concerns the residence time distribution of materials that are being processed. Residence time distribution is measured in terms of cell equivalents, the higher the number of cell equivalents the better (or "tighter") is the residence time distribution. A tight residence time distribution allows each particle to experience nearly the same processing time in the reactor and provides good product quality, quicker product changes, and improved reactor performance. In one embodiment, a tight residence time distribution means at least 80% of the particles exit within 20% of the mean residence time. Further, in reactors where the residence time distribution is tight, the particles follow a first-in-first-out trajectory causing old feed material to be flushed out by new feed material in fewer than five reactor volumes of material.

In a non-limiting aspect, the continuous fluidized bed reactor of the present invention is particularly well suited to the processing of starches, including starch thermal inhibition, dextrinization, oxidation, etc., since starches are cohesive and thus are difficult to fluidize. The invention also contemplates physical as well as chemical processes, such as drying. Starches can be effectively dried in the practice of the invention. In addition, other physical and/or chemical processes can be carried out on other solids difficult to fluidize. Starches, as used herein, is intended to include starch, starch-containing materials, or materials derived from starch.

A starch that may be dextrinized, or thermally inhibited, in accordance with the process of this invention may be derived from a variety of starchy materials, including cereal starches, waxy starches and/or root starches. Typical of such starch materials are non-waxy cereal starches (i.e., corn starch and wheat starch), potato starch, tapioca starch, grain sorghum starch, rice starch; waxy starches (i.e., waxy milo starch, waxy maize starch), high amylose starches, etc. In one embodiment, waxy cereal starches are used. In another embodiment waxy corn starch is used.

As will be appreciated by those skilled in the art, differing types of fluidizing media can be used. For example, steam or inert gases such as argon, nitrogen, carbon dioxide, etc. can be used. In a non-limiting aspect, some moisture may be added to the inert gases. In addition, flue gases from combustion operations can similarly be used as the fluidizing medium, if desired. It is not essential that the fluidizing medium add any sensible heat to the material, such as starch undergoing dextrinization, since the tubular section of the reactor employed with the concepts in the practice of this invention is capable of providing all of the heat necessary to efficiently effect the reaction.

While the invention has been described in connection with specific embodiments thereof, it will be understood that it is capable of further modification, and this application is intended to cover any variations, uses or adaptations of the invention following, in general, the principles of the invention and including such departures from the present disclosure as come within the known or customary practice in the art to which the invention pertains and as may be applied to the essential features hereinbefore set forth, and as falls within the scope of the invention.

EXAMPLES

Example 1

The following example is based on a continuous fluidized bed for processing starch.

As represented in FIG. 2, a fluidized bed was constructed containing 60 cells in series arranged into 20 rows of three cells per row. Each cell was linked to the preceding and following cells via tunnels at their bases and each cell had isolated freeboards. Each cell had two filter sticks to provide six filter sticks per row. The filter sticks were used to remove starch fines from the fluidization gas before the gas exited the reactor. Each of the six filter sticks in each row was connected individually by a blow back line to the adjacent filter stick in the next row to provide six columns of 20 linked filter sticks. Periodically, each column of filter sticks had gas passed back through it to clean the built-up starch from the stick surfaces.

In one set of residence time distribution studies, one filter stick column at a time was blown back for five seconds in the following pattern that was repeated every 30 seconds: column 1, column 3, column 5, column 2, column 4, column 6. During blow back, the pressure in the blown back cells increased by no more than 3 inches of water. Computer simulations illustrated that the pressure increase was sufficient to drive starch out of the blown back cell and into adjacent cells. This experiment showed that although the continuous fluidized bed reactor had 60 cells, its residence time distribution resembled that of a 20 cell unit.

In a second set of residence time distribution studies, the six filter stick columns were divided into two groups—Group A consisted of column 1, column 3 and column 5, and Group B consisted of column 2, column 4 and column 6. Each Group was blown back for 5 seconds while the other Group vented fluidization gas. The resulting pressure variation between cells was less than 1 inch of water. The pressure in each cell did not vary with time because each cell had one filter venting and one filter cleaning. The residence time distribution with this blow back routine was equivalent to a 49 cell unit. Computer simulations confirmed that the improved performance was due to pressure balancing throughout the unit.

We claim:

1. A continuous fluidized bed apparatus for fluidization of solid materials, wherein said apparatus comprises:
    (a) at least two cells connected by an aperture permitting the solid material to be introduced into the next downstream cell by fluidized horizontal flow;
    (b) an isolated freeboard within each cell;
    (c) at least two filter sticks contained within the isolated freeboard of each cell;
    (d) at least one blow back valve contained within each filter stick;
    and wherein a substantially constant pressure difference is maintained between each isolated freeboard.

2. The apparatus according to claim 1, wherein the solid materials are materials that are difficult to fluidize.

3. The apparatus according to claim 2, wherein the solid material is selected from the group consisting of a starch, a starch-containing material, or a material derived from starch.

4. The apparatus according to claim 1, wherein the apparatus comprises at least 10 cells.

5. The apparatus according to claim 4, wherein the apparatus comprises at least 25 cells.

6. The apparatus according to claim 1, wherein the substantially constant pressure between freeboards differs by no more than 1000 Pascal.

7. The apparatus of claim 6, wherein the pressure differs by no more than 500 Pascal.

8. The apparatus of claim 6, wherein the pressure differs by no more than 250 Pascal.

9. The apparatus of claim 6, wherein there are at least 2 blow back valves.

10. The apparatus of claim 9, wherein the blow back valves activate within 0.25 seconds of each other.

11. The apparatus of claim 10, wherein the blow back valves activate within 0.05 seconds of each other.

12. The apparatus of claim 11, wherein the blow back valves activate within 0.01 seconds of each other.

13. A method of thermally inhibiting starch comprising processing the starch in the apparatus of claim 1.

14. A method of dextrinizing starch comprising processing the starch in the apparatus of claim 1.

15. The method of claim 13, wherein the residence time distribution of the starch is tight.

16. The method of claim 15, wherein at least 80% of the starch exit within 20% of a mean residence time.

17. The method of claim 14, wherein the residence time distribution of the starch is tight.

18. The method of claim 17, wherein at least 80% of the starch exit within 20% of a mean residence time.

* * * * *